United States Patent
Tsafrir et al.

(10) Patent No.: US 11,301,397 B2
(45) Date of Patent: Apr. 12, 2022

(54) MULTIPLE PROCESSOR COMPUTING DEVICE WITH CONFIGURABLE ELECTRICAL CONNECTIVITY TO PERIPHERALS

(71) Applicant: Technion Research & Development Foundation Limited, Haifa (IL)

(72) Inventors: Dan Tsafrir, Haifa (IL); Igor Smolyar, Rosh HaAyin (IL)

(73) Assignee: Technion Research & Development Foundation Limited, Haifa (IL)

(*) Notice: Subject to any disclaimer, the term of this patent is extended or adjusted under 35 U.S.C. 154(b) by 0 days.

(21) Appl. No.: 17/049,621

(22) PCT Filed: Apr. 24, 2019

(86) PCT No.: PCT/IL2019/050462
§ 371 (c)(1),
(2) Date: Oct. 22, 2020

(87) PCT Pub. No.: WO2019/207586
PCT Pub. Date: Oct. 31, 2019

(65) Prior Publication Data
US 2021/0248092 A1    Aug. 12, 2021

Related U.S. Application Data

(60) Provisional application No. 62/661,742, filed on Apr. 24, 2018.

(51) Int. Cl.
*G06F 9/30* (2018.01)
*G06F 3/06* (2006.01)
(Continued)

(52) U.S. Cl.
CPC .......... *G06F 13/126* (2013.01); *G06F 13/102* (2013.01); *G06F 13/409* (2013.01); *G06F 13/4068* (2013.01); *G06F 2213/0026* (2013.01)

(58) Field of Classification Search
None
See application file for complete search history.

(56) References Cited

U.S. PATENT DOCUMENTS

2003/0041190 A1* 2/2003 Kolli ................... G06F 13/4059
710/38
2003/0196142 A1* 10/2003 Brooks ............... G06F 9/45558
714/28

(Continued)

FOREIGN PATENT DOCUMENTS

| CN | 1909462 | 2/2007 |
|---|---|---|
| CN | 103400086 | 11/2013 |
| WO | WO 2019/207586 | 10/2019 |

OTHER PUBLICATIONS

International Preliminary Report on Patentability dated Nov. 5, 2020 From the International Bureau of WIPO Re. Application No. PCT/IL2019/050462. (6 Pages).

(Continued)

*Primary Examiner* — Hyun Nam (57) ABSTRACT

A computing device, comprising at least one peripheral computing component, electrically connected to each of a plurality of hardware processors; wherein at least one of the plurality of hardware processors is adapted to executing a code for: configuring the at least one peripheral computing component to access at least one first memory location in a first memory component electrically coupled with a first hardware processor of the plurality of hardware processors via a first electrical connection between the peripheral computing component and the first hardware processor; and configuring the at least one peripheral computing component to access at least one second memory location in a second memory component electrically coupled with a second hardware processor of the plurality of hardware processors via a second electrical connection between the peripheral com- (Continued)

puting component and the second hardware processor; and wherein the first hardware processor is not the second hardware processor.

10 Claims, 5 Drawing Sheets

(51) Int. Cl.
  *G06F 13/12* (2006.01)
  *G06F 13/10* (2006.01)
  *G06F 13/40* (2006.01)

(56) References Cited

U.S. PATENT DOCUMENTS

| | | | | |
|---|---|---|---|---|
| 2005/0246460 A1* | 11/2005 | Stufflebeam | ........ | G06F 13/4022 710/104 |
| 2006/0245225 A1* | 11/2006 | Vorbach | .............. | G06F 11/3656 365/6 |
| 2007/0078940 A1* | 4/2007 | Fineberg | ................. | G06F 13/28 709/216 |
| 2012/0210172 A1* | 8/2012 | Gara | ................... | G06F 11/1654 714/37 |
| 2012/0290763 A1 | 11/2012 | Li | | |
| 2013/0013893 A1* | 1/2013 | Silverbrook | .......... | G06T 3/0006 712/42 |

OTHER PUBLICATIONS

International Search Report and the Written Opinion dated Jul. 25, 2019 From the International Searching Authority Re. Application No. PCT/IL2019/050462. (12 Pages).

AMD "AMD I/O Virtualization Technology (IOMMU) Specification", Advanced Micro Devices, AMD, IOMMU Architectural Specification, PID # 48883, Revision 2.00, p. 1-167, Mar. 24, 2011.

Fayoumi et al. "Shared Memory Computing With Virtualized PCI-e IO and Addressing", Proceedings of the 2012 International Conference on Parallel and Distributed Processing Techniques and Applications, PDPTA '12, The Steering Committee of The World Congress in Computer Science, Computer Engineering and Applied Computing, WorldComp, Las Vegas, Nevada, USA, Jul. 16-19, 2012, II: 890-894, Jul. 16, 2012.

* cited by examiner

310
Configure to access at least one first memory location

320
Configure to allow the first hardware processor

330
Configure to access at least one second memory location

340
Configure to allow the second hardware processor

410
Configure to access at least one third memory location

FIG. 4

FIG. 5

MULTIPLE PROCESSOR COMPUTING DEVICE WITH CONFIGURABLE ELECTRICAL CONNECTIVITY TO PERIPHERALS

RELATED APPLICATIONS

This application is a National Phase of PCT Patent Application No. PCT/IL2019/050462 having International filing date of Apr. 24, 2019, which claims the benefit of priority under 35 USC § 119(e) of U.S. Provisional Patent Application No. 62/661,742, filed on Apr. 24, 2018. The contents of the above applications are all incorporated by reference as if fully set forth herein in their entirety.

FIELD AND BACKGROUND OF THE INVENTION

The present invention, in some embodiments thereof, relates to a multi-processor computing device and, more specifically, but not exclusively, to a multi-processor computing device having a network adapter. A multi-processor computing device is a computing device comprising a plurality of hardware processors. A hardware processor is typically, but not exclusively, a processor executing a plurality of programmed instructions, also referred to as code or software code. Optionally a hardware processor comprises a single processing unit (core). Optionally, a hardware processor comprises two or more independent processing units (cores).

Henceforth, the term "memory access" refers to reading from a digital memory component or writing to a digital memory component. Some examples of a digital memory component are a random-access memory (RAM) component, a read-only memory (ROM) component, and a non-volatile random-access memory (NVRAM) component. For brevity, the term "memory component" is used to mean "digital memory component" and the terms are used interchangeably.

As used herein, a peripheral component is a component that is connected to a computer but is not a core element of the computer's core architecture. Some core elements of a computer are a central processing unit, a power supply, a motherboard and a computer case. Some examples of a peripheral component are a mouse, a keyboard, a monitor, a printer, a hard disk drive, an NVMe SSD drive, and a network adapter. A network adapter is a component comprising a digital network controller and a port for connecting a computing device to a digital communication network, for example an Ethernet network or a wireless network. The term peripheral computing component, as used herein, refers to a peripheral component that accesses a memory component. There exist computer architectures of a computing device comprising a plurality of memory components, each coupled with one of a plurality of hardware processors, where a peripheral computing component is electrically connected to the plurality of memory components via one hardware processor of the plurality of hardware processors. For example, in some computing devices the peripheral computing component is electrically connected to an input-output (I/O) controller component which is electrically connected to the one hardware processor. An I/O controller component is a set of microchips which help in communication of data between a hardware processor and one or more components of a computing device, for example a peripheral computing component. Some data managed by an I/O controller component may be associated with direct memory access (DMA), where the I/O controller component assists in data transfer between the peripheral computation component and a memory component. Some data managed by an I/O controller may be associated with direct cache access, where the I/O controller assists in data transfer between the peripheral computing component and a last level cache on a hardware processor.

SUMMARY OF THE INVENTION

It is an object of the present invention to provide a device and a method for a multi-processor computing device.

The foregoing and other objects are achieved by the features of the independent claims. Further implementation forms are apparent from the dependent claims, the description and the figures.

According to a first aspect of the invention, a computing device comprises at least one peripheral computing component, electrically connected to each of a plurality of hardware processors. At least one of the plurality of hardware processors is adapted to executing a code for: configuring the at least one peripheral computing component to access at least one first memory location in a first memory component electrically coupled with a first hardware processor of the plurality of hardware processors via a first electrical connection between the peripheral computing component and the first hardware processor; and configuring the at least one peripheral computing component to access at least one second memory location in a second memory component electrically coupled with a second hardware processor of the plurality of hardware processors via a second electrical connection between the peripheral computing component and the second hardware processor. The first hardware processor is not the second hardware processor.

According to a second aspect of the invention, a method for a computing device comprises: configuring at least one peripheral computing component of a computing device to access at least one first memory location in a first memory component electrically coupled with a first hardware processor of a plurality of hardware processors of the computing device via a first electrical connection between the peripheral computing component and the first hardware processor; and configuring the at least one peripheral computing component to access at least one second memory location in a second memory component electrically coupled with a second hardware processor of the plurality of hardware processors via a second electrical connection between the peripheral computing component and the second hardware processor. The first hardware processor is not the second hardware processor.

According to a third aspect of the invention, a method of creating a computing device comprises: providing at least one peripheral computing component, a plurality of hardware processors, and a plurality of memory components; for each of the plurality of memory components, selecting one of the plurality of hardware processors and electrically connecting the memory component to the selected hardware processor; and electrically connecting the at least one peripheral computing component to each of the plurality of hardware processors such that a first electrical connection between the peripheral computing component and a first hardware processor of the plurality of hardware processors is different from a second electrical connection between the peripheral computing component and a second hardware processor of the plurality of hardware processors.

With reference to the first and second aspects, in a first possible implementation of the first and second aspects of the present invention, each of the plurality of hardware processors is electrically connected to an input-output (I/O) controller component. The at least one peripheral computing component is electrically connected to at least some of the plurality of hardware processors via respective I/O controller component. Connecting the at least one peripheral computing component via respective I/O controller component allows the at least one peripheral computing component to access each of the plurality of memory components using a local access of respective hardware processor, reducing latency of a memory access.

With reference to the first and second aspects, in a first possible implementation of the first and second aspects of the present invention, the at least one peripheral computing component is electrically connected to at least some of the plurality of hardware processors via a plurality of conductive tracks of a printed circuit board. Optionally, the at least one peripheral computing component is electrically connected to at least some of the plurality of hardware processors via at least one electro-mechanical electronical connector.

With reference to the first and second aspects, in a first possible implementation of the first and second aspects of the present invention, the code is further for: configuring the at least one peripheral computing component to allow the first hardware processor to access at least one first component value of the at least one peripheral computing component by accessing at least one first local memory address local to the first hardware processor; and configuring the at least one peripheral computing component to allow the second hardware processor to access at least one second component value of the at least one peripheral computing component by accessing at least one second local memory address local to the second hardware processor. Mapping the at least one peripheral computing component to at least one first local memory address local to the first hardware processor and to at least one second local memory address local to the second hardware processor facilitates mitigating latency in a plurality of memory accesses from each of the first hardware processor and the second hardware processor and the at least one peripheral computing component and, increasing throughput of one or more applications executed by the plurality of hardware processors. Optionally, the at least one peripheral computing component exposes a plurality of interfaces, each comprising a plurality of registers. Optionally, configuring the at least one peripheral computing component to access the at least one first memory location comprises writing to at least one first register of a first interface of the plurality of interfaces. Optionally, configuring the at least one peripheral computing component to allow the first hardware processor to access the at least one first component value comprises writing to at least one second register of the first interface of the plurality of interfaces. Optionally, configuring the at least one peripheral computing component to access the at least one second memory location comprises writing to at least one third register of a second interface of the plurality of interfaces. Optionally, configuring the at least one peripheral computing component to allow the second hardware processor to access the at least one second component value comprises writing to at least one fourth register of the second interface of the plurality of interfaces. Using more than one interface of a plurality of interfaces implemented by the at least one peripheral computing component facilitates configuring the at least one peripheral computing component to communicate with the first hardware processor using a first plurality of memory addresses local to the first hardware processor and to communicate with the second hardware processor using a second plurality of memory addresses local to the second hardware processor, reducing latency of a plurality of memory accesses between the at least one peripheral computing component and the first memory component and the second memory component, thus increasing throughput of one or more applications executed by the plurality of hardware processors. Optionally, the at least one peripheral computing component is electrically connected to each of the plurality of hardware processors according to the Peripheral Component Interconnect Special Interest Group (PCI-SIG) Peripheral Component Interconnect Express (PCIe) standard. Optionally, the at least one peripheral computing component implements a plurality of PCIe physical functions (PFs). Optionally, each of the plurality of interfaces is associated with one of the plurality of PCIe PFs. Using PCI PFs allows using some existing code, reducing cost of implementation of a device according to the present invention.

With reference to the first and second aspects, in a first possible implementation of the first and second aspects of the present invention, the at least one peripheral computing component is at least one digital communication network adapter. Optionally, the at least one digital communication network adapter has a single media access control (MAC) address. Optionally, the at least one digital communication network adapter is connected to at least one digital communication network. Optionally, the at least one digital communication network adapter is configured to write a plurality of digital byte values extracted from a digital message received via the at least one digital communication network to a first plurality of memory locations in the first memory component, subject to a first result value of applying an identified filter test to the digital message, and alternatively to write the plurality of digital byte values to a second plurality of memory locations in the second memory component subject to a second result value of applying the identified filter test to the digital message. Applying a filter to a digital message received from a digital communication network allows reducing latency of a plurality of memory accesses to transfer the digital message to an application executed by at least one of the plurality of hardware processors, increasing throughput of the application.

With reference to the first and second aspects, in a first possible implementation of the first and second aspects of the present invention, the code is additionally for: configuring the at least one peripheral computing component to access at least one third memory location in a third memory component electrically coupled with a third hardware processor of the plurality of hardware processors via a third electrical connection between the peripheral computing component and the third hardware processor, instead of accessing the at least one first memory location. Configuring the at least one peripheral computing component to access the at least one third memory location in the third memory component via the third electrical connection allows moving a software thread from executing on the first hardware processor to execute on the third hardware processor without adding latency to memory accesses, preventing degradation in throughput of the software thread due to migration from the first hardware processor to the third hardware processor.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to a multi-processor computing device and, more specifically, but not exclusively, to a multi-processor computing device with a network adapter.

In computer design, the term non-uniform memory access (NUMA) refers to a computer design where when a hardware processor accesses a memory component, memory access time depends on location of the memory component relative to the hardware processor. In a computing device comprising a plurality of hardware processors, each of a plurality of memory components may be electrically coupled with one of the plurality of hardware processors. When memory access time is non-uniform, a first hardware processor of the plurality of hardware processors accesses a first memory component electrically coupled with the first hardware processor faster than the first hardware processor accesses a second memory component electrically coupled with a second hardware processor of the plurality of hardware processors.

In a computing device where the peripheral computing component is connected to one of the plurality of hardware processors, access time of the peripheral computing component to one of the plurality of memory components may be non-uniform and may depend on location of the memory component relative to the peripheral computing component. For example, when the peripheral computing component is electrically connected to a first hardware processor of the plurality of hardware processors, the peripheral computing component may access a first memory component electrically coupled with the first hardware processor via a memory controller coupled with the first hardware processor and controlling access to the first memory component. A memory controller is a digital circuit managing flow of data to and from a memory component. However, to access a second memory component electrically coupled with a second hardware processor of the plurality of hardware processors, the peripheral computing component may be required to use a connection between the I/O controller component of the first hardware processor and the second memory component. Such a connection may introduce latency to the data transfer between the peripheral computing component and the second memory component. As a result, a first access time between the peripheral computing component and the first memory component electrically coupled with the first hardware processor may be faster than a second access time between the peripheral computing component and the second memory component. The second memory component is considered remote to the first hardware processor and thus remote to the peripheral computing component. Non-uniform DMA (NUDMA) between the peripheral computing component and the plurality of memory components, i.e. slower access time to a remote memory component than to a local memory component, may degrade performance of an application executed by the computing device.

In the context of computer programming, a thread is a sequence of programmed instructions that can be managed independently by a scheduler, which is typically a part of the operating system. In a multi-processor processing device, a peripheral computing component may interact with a first thread executing on a first hardware processor and with a second thread executing on a second hardware processor. For example, when the peripheral computing component is a digital communication network adapter the first thread may implement part of a first network-based application, for example a web browser, and the second thread may implement part of a second network-based application, for example an electronic mail client. Some other examples of network-based applications are a streamed video player, a real-time video conferencing application, an internet phone application, a file transfer application, and an instant messaging application. Both the first network-based application and the second network-based application transfer data to the digital communication network adapter to be sent to one or more remote processors, and additionally or alternatively receive data from the one or more remote processors via the digital communication network adapter. Another example of a peripheral computing component that interacts with more than one application is a high speed storage device such as a non-volatile memory express (NVMe) solid state drive (SSD). Several possible solutions to mitigate effects of NUMA exists, however such possible solutions do not reduce effects of NUDMA. For example, according to some computer architectures where a peripheral computing component is connected to an identified hardware processor of a plurality of hardware processors, a thread, executing on a hardware processor of the plurality of hardware processors, allocates memory only in a local memory component, directly coupled with the hardware processor. In a computing device implemented according to such computer architectures, memory access between the plurality of hardware processors and the plurality of memory components is uniform as a hardware processor accesses only its local memory component. In such a solution the first thread communicates with the peripheral computing component using a first memory component electrically coupled with the first hardware processor and the second thread communicates with the peripheral computing component using a second memory component electrically coupled with the second hardware processor. When the peripheral computing component is electrically connected only to the first hardware processor, memory accesses between the peripheral computing component and the second memory component are with a remote memory component, increasing total latency of memory accesses and degrading performance of the second thread.

Some other solutions propose statically allocating all threads that interact with the peripheral computing component to an identified hardware processor of the plurality of processors, electrically connected to the peripheral computing component. However the identified hardware processor may become overloaded, degrading performance of one or more of a plurality of threads executed by the identified hardware processor.

Some other solutions propose installing multiple identical peripheral computing components, one for each of the plurality of hardware processors. Using a plurality of identical peripheral computing components increases cost of manufacturing the computing device, as well as cost of operation, for example due to increased power consumption. Current computing practices propose migrating threads between the plurality of processors to increase performance by balancing computation and network load between the plurality of hardware processors. However, some applications may not support migrating from one of the multiple peripheral computing components to another of the multiple peripheral computing components. For example, when the multiple identical peripheral computing components are each a digital network communication adapter, each of the multiple peripheral computing components has its own media access control (MAC) address and its own Internet Protocol (IP) address associated with its own MAC address. Migration of an application that uses one digital communication network adapter to use another digital communication network adapter may require closing one or more network connections of the computing device with one or more remote processors via one of the multiple peripheral computing components and re-establishing the one or more network connections via another of the multiple peripheral computing components, which may interrupt one or more services provided by the application. In a solution comprising multiple identical computing components, migrating a thread that uses a first peripheral computing component from one hardware processor to another hardware processor without changing the peripheral computing component used by the thread may result in the peripheral computing component accessing a remote memory component electrically coupled with the other hardware processor which in turn may degrade performance of the thread.

The present invention, in some embodiments thereof, proposes electrically connecting a peripheral computing component to each of a plurality of hardware processors of a computing device, allowing the peripheral computing component local memory access to a plurality of memory components via the plurality of hardware processors. According to some embodiments of the present invention, the peripheral computing component is configured to access at least one first memory location in a first memory component electrically coupled with a first hardware processor of the plurality of hardware processors via a first electrical connection between the peripheral computing component and the first hardware processor. Optionally, the peripheral computing component is configured to access at least one second memory location in a second memory component electrically coupled with a second hardware processor of the plurality of hardware processors via a second electrical connection between the peripheral computing component and the first hardware processor. Optionally, the first hardware processor is not the second hardware processor. Accessing the first memory location via the first electrical connection and the second memory location via the second electrical connection facilitates reducing an amount of remote memory accesses of the peripheral computing component thus reducing latency of a plurality of memory accesses, which in turn facilitates increasing performance of one or more services provided by one or more applications executed by the computing device.

In addition, using a plurality of electrical connections to connect the plurality of hardware processors to the peripheral computing component allows, in some embodiments thereof, reconfiguring the peripheral computing component to access at least one third memory location in a third memory component, electrically coupled with a third hardware processor of the plurality of hardware processors via a third electrical connection between the peripheral computing component and the third hardware processor, instead of accessing the at least one first memory location. This allows migrating a thread from executing on the first hardware processor to executing on the third hardware processor without interrupting one or more network connections of the computing device with one or more remote processors, increasing performance and availability of one or more applications executed by the computing component.

Peripheral Component Interconnect Special Interest Group (PCI-SIG) Peripheral Component Interconnect Express (PCIe) standard is a standard for a high speed serial computer expansion bus for moving digital data between one or more core components of a computing and one or more peripheral components. PCIe is a packet switching point-to-point serial protocol. In some embodiments, the present invention proposes using the PCIe standard to electrically connect the peripheral computation component to each of the plurality of hardware processors. As PCIe is a packet switching point-to-point serial protocol, an electrical connection between the peripheral computing component and a hardware processor is exclusive, reducing latency of memory accesses due to contention for bus resources between accesses to more than one hardware processor. The PCIe standard supports a peripheral component exposing a plurality of functions, each having an interface. Using PCIe allows associating each of the plurality of hardware processors with one of the plurality of functions, providing each of the plurality of hardware processors with an interface of the peripheral computing component dedicated to the hardware processor. Each interface is optionally configured to allow the peripheral computing component to access memory local to the interface's respective hardware processor via an electrical connection between the peripheral computing component and the interface's respective hardware processor. Using the plurality of functions of PCIe allows using existing configuration methods to reduce an amount of remote memory accesses of the peripheral computing process, increasing stability of a system comprising a computing device implemented according to the present invention and reducing cost of installation and operation of such a system. In addition, using PCIe's functions allows implementing the present invention in existing systems having one or more PCIe electro-mechanical electronical connectors using one or more electro-mechanical extenders, extending the one or more PCIe electro-mechanical electronical connectors and adapted to electrically connect the peripheral computing component to each of the plurality of hardware processors. Using one or more electro-mechanical extenders allows reducing memory latency in some existing computing devices without replacing the existing computing devices, reducing cost of operation to increase performance of a system comprising such existing computing devices.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
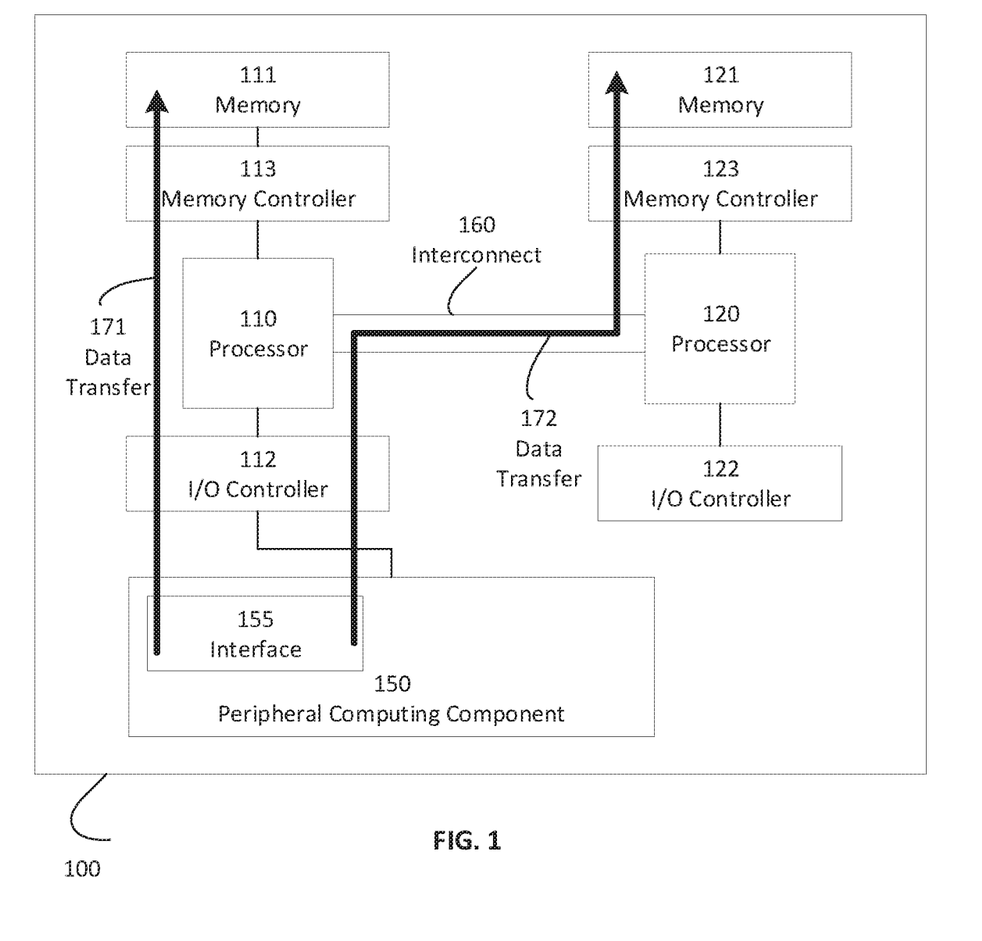
FIG. 1 is a schematic block diagram of an exemplary computing device implemented with non-uniform direct memory access.

Reference is now made to FIG. 1, showing a schematic block diagram of an exemplary computing device 100 implemented with non-uniform direct memory access. Computing device 100 comprises a plurality of hardware processors, comprising for example first hardware processor 110 and second hardware processor 120. Optionally first hardware processor 110 is not second hardware processor 120. Each of the plurality of hardware processors may be electrically coupled with at least one of a plurality of memory components. In this example, first hardware processor 110 is electrically coupled with first memory component 111 and second hardware processor 121 is electrically coupled with second memory component 121. Optionally, at least one of the plurality of memory components is electrically coupled with the respective at least one memory component via a memory controller. For example, first hardware processor 110 may be electrically coupled with first memory component 111 via optional memory controller 113, and second hardware processor 121 may be electrically coupled with second memory component 121 via optional memory controller 123. At least one peripheral computing component 150 is connected to one of the plurality of hardware processors, for example first hardware processor 110. Optionally, at least one peripheral computing component 150 is connected to first hardware processor 110 via first I/O controller component 112. Optionally, second hardware processor 120 is electrically connected to second I/O controller component 122. Optionally, at least one peripheral computing component implements at least one interface 155. A first memory access 171 for the purpose of data transfer between peripheral computing component 150 and first memory component 111 may be via first I/O controller 112, local to at least one peripheral computing component 150. Optionally, first memory access 171 is via at least one interface 155. First memory access 171 may have a first access time. However, a second memory access 172 for the purpose of data transfer between at least one peripheral computing component 150 and second memory component 121 may be via connection 160 connecting between first I/O controller component 112 and second memory component 121. In a computing device implemented with non-uniform direct memory access a second access time, of second memory access 172 via connection 160, optionally via at least one interface 155, may be longer than the first access time, reducing performance of at least one thread executed by one of the plurality of hardware processors and transferring data between at least one peripheral computing component 150 and second memory component 121.

Figure 2:
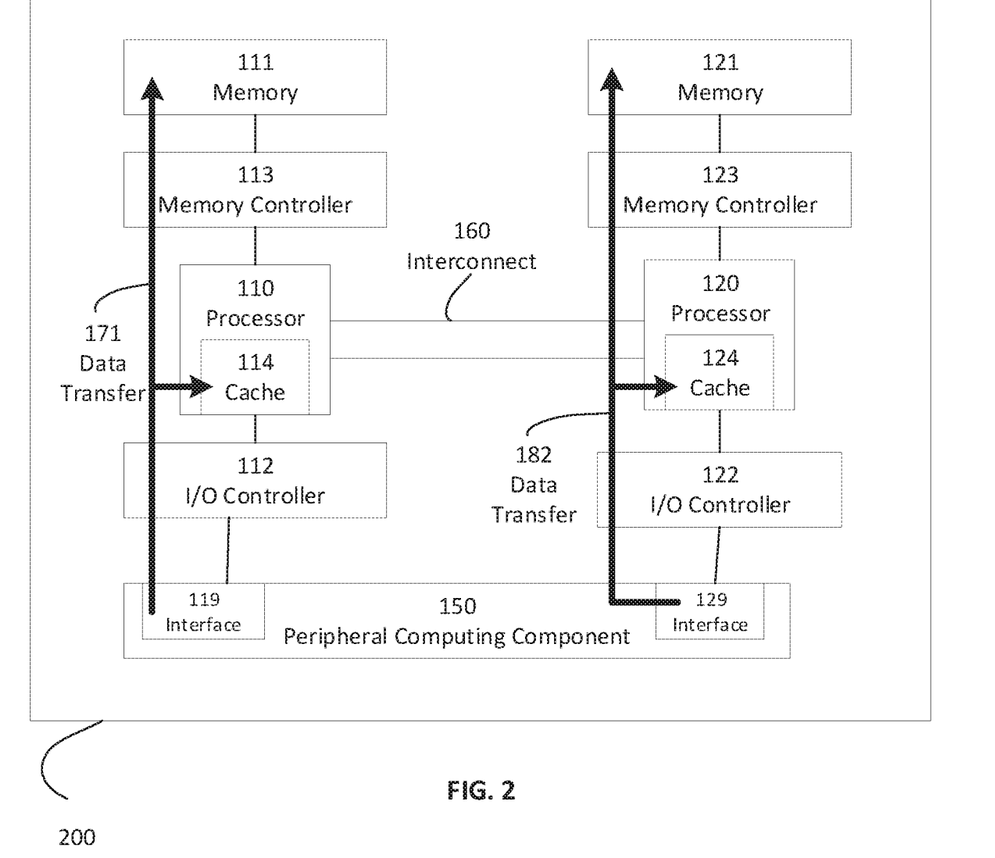
FIG. 2 is a schematic block diagram of an exemplary computing device, according to some embodiments of the present invention.

Reference is now made also to FIG. 2, showing a schematic block diagram of an exemplary computing device 200, according to some embodiments of the present invention. In such embodiments, at least one peripheral computing component 150 is electrically connected to each of the plurality of hardware processors, for example first hardware processor 110 and second hardware processor 120. Optionally, a first electrical connection connecting at least one peripheral computing component 150 to first hardware processor 110 is different from a second electrical connection connecting at least one peripheral computing component 150 to second hardware processor 120. A printed circuit board is a board having a plurality of pads for mounting one or more electrical components and a plurality of conductive tracks electrically connecting at least some of the plurality of pads, thus electrically connecting at least some of the one or more electrical components. Optionally, at least one peripheral computing component 150 and the plurality of hardware processors are mounted on a printed circuit board and at least one peripheral computing component 150 is electrically connected to at least some of the plurality of hardware processors via a plurality of conductive tracks of the printed circuit board. Optionally, at least one peripheral computing component 150 is mounted on a first printed circuit board and at least some of the plurality of hardware processors are mounted on a second printed circuit board and at least one peripheral computing component 150 is electrically connected to the at least some of the plurality of hardware processors via one or more electro-mechanical electronical connectors mounted on the second printed circuit board, also known as one or more extension slots, optionally used to connect the first printed circuit board to the second printed circuit board.

Optionally, at least one peripheral computing component 150 is electrically connected to each of the plurality of the plurality of hardware processors according to the PCI-SIG PCIe standard, using a first set of electrical connections, called lanes, to connect at least one peripheral computing component 150 to first hardware processor 110 and a second set of lanes to connect at least one peripheral computing component 150 to second hardware processor 120. Optionally, at least one peripheral computing component 150 implements a plurality of PCIe functions. Optionally, each of the plurality of hardware processors is associated with one of the plurality of PCIe functions. Optionally, each of the plurality of hardware processors is associated with one and only one of the plurality of PCIe functions.

Optionally, each of the plurality of hardware processors is electrically connected to an I/O controller component, for example first hardware processor 110 may be connected to first I/O controller component 112 and second hardware processor 120 may be connected to second I/O controller component 122. Optionally, at least one peripheral computing component 150 is connected to at least some of the plurality of hardware processors via respective I/O controller component. For example, at least one peripheral computing component 150 may be connected to first hardware processor 110 via first I/O controller component 112, and may be connected to second hardware processor 120 via second I/O controller component 122.

Optionally, at least one peripheral computing component 150 is at least one digital communication network adapter, optionally connected to at least one digital communication network, for example an Ethernet network or a wireless network. Optionally, the at least one digital communication adapter has a single media access control (MAC) address.

Optionally, at least one peripheral computing component 150 implements a plurality of interfaces, each optionally comprise a plurality of registers. For example, at least one peripheral computing component 150 optionally implements first interface 119 and second interface 129. Optionally, each of the plurality of hardware processors is associated with one of the plurality of interfaces. Optionally, each of the plurality of hardware processors is associated with one and only one of the plurality of interfaces. As in computing device 100 described earlier, first memory access 171 for the purpose of data transfer between peripheral computing component 150 and first memory component 111 is optionally via first I/O controller 112, local to at least one peripheral computing component 150 via first interface 119. Optionally, first memory access 171 is to a cache memory 114 of first hardware processor 110. First memory access 171 may have a first access time. However, a second memory access 182 for the purpose of data transfer between at least one peripheral computing component 150 and second memory component 121 is optionally via second I/O controller 122, local to at least one peripheral computing component 150 via second interface 129. Optionally, second memory access 182 is to a cache memory 124 of second hardware processor 120. A second access time of second memory access 182 may be similar to the first access time.

When computing device 200 is implemented using the PCIe standard and at least one peripheral computing component 150 implements a plurality of PCIe functions, each of the plurality of interfaces is optionally associated with one of the plurality of PCIe functions. When at least one peripheral computing component 150 is a digital communication network adapter, each of the plurality of PCIe functions is optionally a PCIe Physical Function (PF), supporting the PCI-SIG single root I/O virtualization (SR-IOV) interface enabling a virtual machine executed by one or more of the plurality of hardware processors to be directly connected to the digital communication network adapter.

In some embodiments of the present invention, computing device 200 implements the following optional method. In such embodiments, at least one of the plurality of hardware processors is adapted to executing a code implementing the following optional method.

Figure 3:
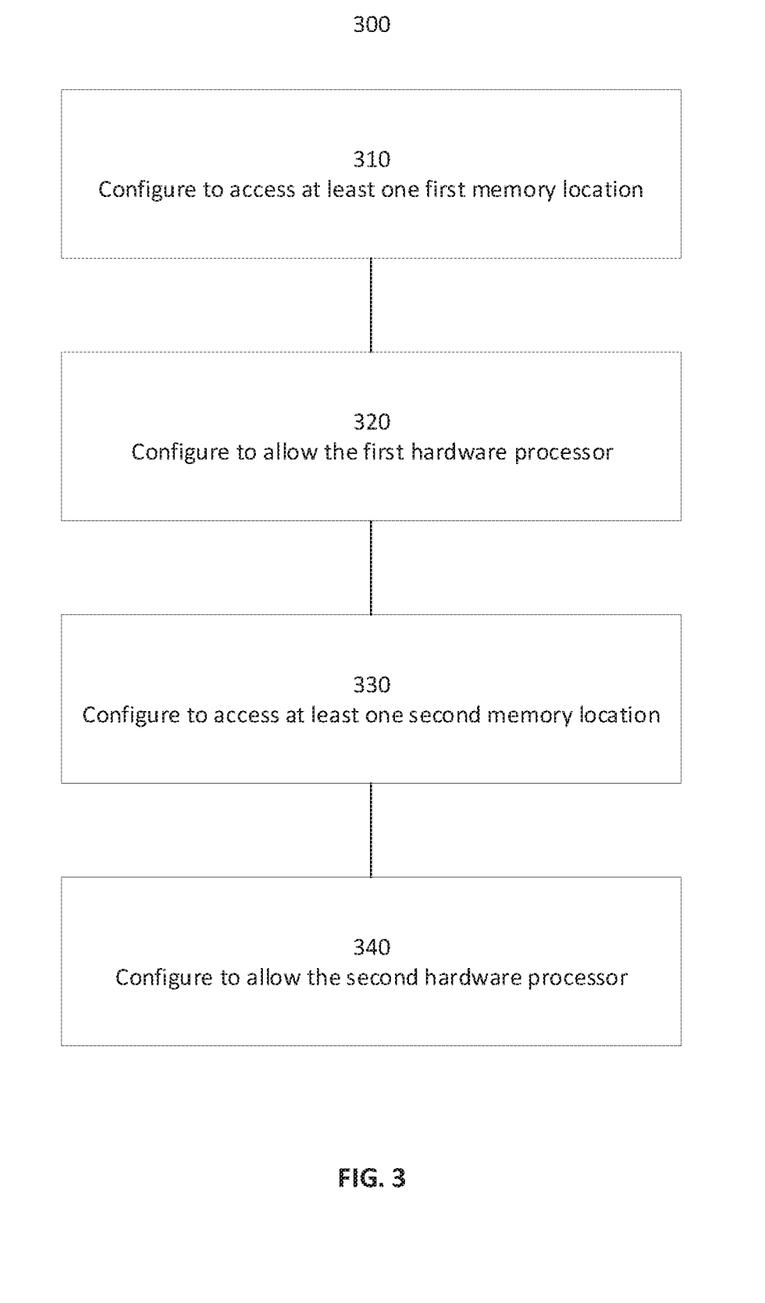
FIG. 3 is a flowchart schematically representing an optional flow of operations for a computing device, according to some embodiments of the present invention.

Reference is now made also to FIG. 3, showing a flowchart schematically representing an optional flow of operations 300 for a computing device, according to some embodiments of the present invention. In such embodiments at least one of the plurality of hardware processors, optionally a third hardware processor of the plurality of hardware processors, configures in 310 at least one peripheral computing component 150, optionally comprising writing to at least one first register of first interface 119, to access at least one first memory location in first memory component 111 via a first electrical connection between at least one peripheral computing component 150 and first hardware processor 110.

In 320, the at least one hardware processor optionally configures at least one peripheral computing component 150, optionally comprising writing to at least one second register of interface first 119, to allow first hardware processor 110 to access at least one first component value of at least one peripheral computing component 150 by accessing at least one first local memory address local to first hardware processor 110.

In 330, the at least one hardware processor optionally configures at least one peripheral computing component 150, optionally by writing to at least one third register of second interface 129, to access at least one second memory location in second memory component 121 via a second electrical connection between at least one peripheral computing component 150 and second hardware processor 120.

In 340, the at least one hardware processor optionally configures at least one peripheral computing component 150, optionally comprising writing to at least one fourth register of second interface 129, to allow second hardware processor 120 to access at least one second component value of at least one peripheral computing component 150 by accessing at least one second local memory address local to second hardware processor 120.

In embodiments where at least one peripheral computing component 150 is at least one digital communication network adapter and is connected to at least one digital communication network, at least one digital communication network adapter 150 optionally steers an incoming digital message received via the at least one digital communication network based on which of the plurality of hardware processors is executing an application thread consuming the digital message. Optionally, at least one digital communication network adapter 150 applies at least one identified filter test to a digital message received via the at least one digital communication network to determine a target memory component for writing a plurality of digital byte values extracted from the digital message. In such embodiments, the at least one hardware processor optionally configures at least one digital communication network adapter 150 to write the plurality of digital byte values to a first plurality of memory locations in first memory component 111, subject to a first result value of applying the at least one identified filter test to the digital message, an alternatively to write the plurality of digital byte values to a second plurality of memory locations in second memory component 121 subject to a second result value of applying the at least one identified filter test to the digital message. Optionally, applying the at least one identified filter test to the digital message comprises computing a hash value according to at least part of the digital message. Optionally, the at least part of the digital message comprises network protocol data, optionally comprising a port identification value. Optionally, at least one digital communication network adapter 150 implements a receive flow steering method, providing a method to steer the digital method to an identified hardware processor of the plurality of hardware processors based on a hash value computed according to protocol data of the digital message, and using one or more steering rules to apply the at least one identified filter test.

According to some embodiments of the present invention, a thread may be migrated from executing on one of the plurality of hardware processors to execute on another of the plurality of hardware processors. To migrate a thread, computing device 200 optionally implements the following method.

Figure 4:
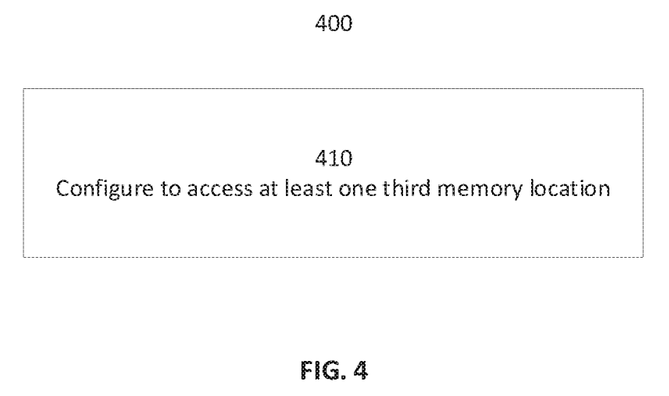
FIG. 4 is a flowchart schematically representing an optional flow of operations for migrating a thread between hardware processors, according to some embodiments of the present invention.

Reference is now made also to FIG. 4, showing a flowchart schematically representing an optional flow of operations 400 for migrating a thread between hardware processors, according to some embodiments of the present invention. In such embodiments, in 410 the at least one hardware processor configures at least one peripheral computing component 150 to access at least one third memory location in a third memory component, electrically coupled with a third hardware processor of the plurality of hardware processors via a third electrical connection between at least one peripheral computing component 150 and the third hardware processor, instead of accessing the at least one first memory location.

Figure 5:
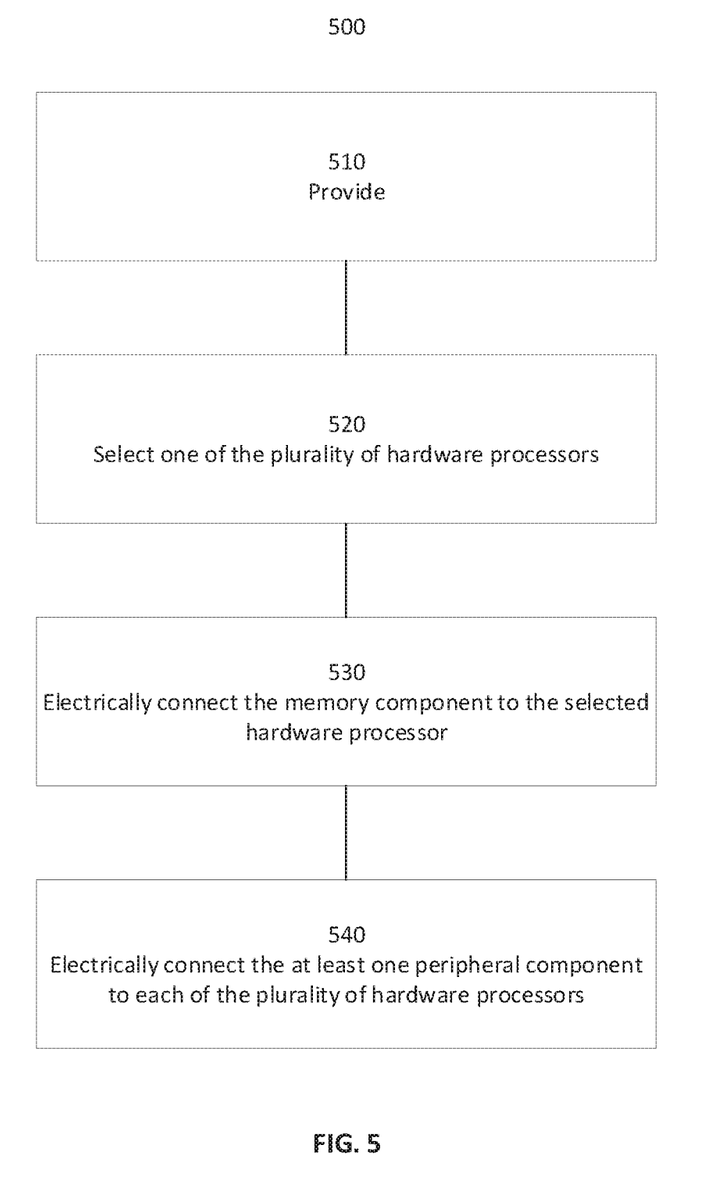
FIG. 5 is a flowchart schematically representing an optional flow of operations for creating a computing device, according to some embodiments of the present invention.

In some embodiments of the present invention, computing device 200 is created using the following optional method. Reference is now made also to FIG. 5, showing a flowchart schematically representing an optional flow of operations 500 for creating a computing device, according to some embodiments of the present invention. In such embodiments, in 510 at least one peripheral computing component 150, a plurality of hardware processors comprising first hardware processor 110 and second hardware processor 120, and a plurality of memory components comprising first memory component 111 and second memory component 121 are provided. For one of the memory components, optionally in 520 one of the plurality of hardware processors is selected and in 530 the memory component is optionally electrically connected to the selected hardware processor. For example, for first memory component 111, in 520 first hardware processor 110 is optionally selected and in 530 first memory component 111 is optionally electrically connected to first hardware processor 110. In another example, for second memory component 121, in 520 second hardware processor 120 is optionally selected and in 530 second memory component 121 is optionally electrically connected to second hardware processor 120. 520 and 530 are optionally repeated for each of the plurality of memory components. Optionally, in 540 at least one peripheral computing component 150 is electrically connected to each of the plurality of hardware processors such that a first electrical connection between at least one peripheral computing component 150 and first hardware processor 110 is different from a second electrical connection between at least one peripheral computing component 150 and second hardware processor 120.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant electrical connections will be developed and the scope of the term electrical connections is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

What is claimed is:

1. A computing device, comprising at least one peripheral computing component, electrically connected to each of a plurality of hardware processors;
    wherein at least one of the plurality of hardware processors is adapted to executing a code for:
    configuring the at least one peripheral computing component to access at least one first memory location in a first memory component electrically coupled with a first hardware processor of the plurality of hardware processors via a first electrical connection between the peripheral computing component and the first hardware processor; and
    configuring the at least one peripheral computing component to access at least one second memory location in a second memory component electrically coupled with a second hardware processor of the plurality of hardware processors via a second electrical connection between the peripheral computing component and the second hardware processor; and
    wherein the first hardware processor is not the second hardware processor;
    wherein the first electrical connection is not the second electrical connection;
    wherein the code is further for:
    configuring the at least one peripheral computing component to allow the first hardware processor to access at least one first component value of the at least one peripheral computing component by accessing at least one first local memory address local to the first hardware processor; and
    configuring the at least one peripheral computing component to allow the second hardware processor to access at least one second component value of the at least one peripheral computing component by accessing at least one second local memory address local to the second hardware processor
    wherein the at least one peripheral computing component exposes a plurality of interfaces, each comprising a plurality of registers;
    wherein configuring the at least one peripheral computing component to access the at least one first memory location comprises writing to at least one first register of a first interface of the plurality of interfaces;
    wherein configuring the at least one peripheral computing component to allow the first hardware processor to access the at least one first component value comprises writing to at least one second register of the first interface of the plurality of interfaces;
    wherein configuring the at least one peripheral computing component to access the at least one second memory location comprises writing to at least one third register of a second interface of the plurality of interfaces; and
    wherein configuring the at least one peripheral computing component to allow the second hardware processor to access the at least one second component value comprises writing to at least one fourth register of the second interface of the plurality of interfaces.

2. The computing device of claim 1, wherein each of the plurality of hardware processors is electrically connected to an input-output (I/O) controller component; and
    wherein the at least one peripheral computing component is electrically connected to at least some of the plurality of hardware processors via respective I/O controller component.

3. The computing device of claim 1, wherein the at least one peripheral computing component is electrically connected to at least some of the plurality of hardware processors via a plurality of conductive tracks of a printed circuit board.

4. The computing device of claim 1, wherein the at least one peripheral computing component is electrically connected to at least some of the plurality of hardware processors via at least one electro-mechanical electronical connector.

5. A computing device, comprising at least one peripheral computing component, electrically connected to each of a plurality of hardware processors;
   wherein at least one of the plurality of hardware processors is adapted to executing a code for:
      configuring the at least one peripheral computing component to access at least one first memory location in a first memory component electrically coupled with a first hardware processor of the plurality of hardware processors via a first electrical connection between the peripheral computing component and the first hardware processor; and
      configuring the at least one peripheral computing component to access at least one second memory location in a second memory component electrically coupled with a second hardware processor of the plurality of hardware processors via a second electrical connection between the peripheral computing component and the second hardware processor; and
   wherein the first hardware processor is not the second hardware processor;
   wherein the first electrical connection is not the second electrical connection;
   wherein the at least one peripheral computing component is at least one digital communication network adapter;
   wherein the at least one digital communication network adapter has a single media access control (MAC) address;
   wherein the at least one digital communication network adapter is connected to at least one digital communication network; and
   wherein the at least one digital communication network adapter is configured to write a plurality of digital byte values extracted from a digital message received via the at least one digital communication network to a first plurality of memory locations in the first memory component, subject to a first result value of applying an identified filter test to the digital message, and alternatively to write the plurality of digital byte values to a second plurality of memory locations in the second memory component subject to a second result value of applying the identified filter test to the digital message.

6. The computing device of claim 1, wherein the at least one peripheral computing component is electrically connected to each of the plurality of hardware processors according to the Peripheral Component Interconnect Special Interest Group (PCI-SIG) Peripheral Component Interconnect Express (PCIe) standard;
   wherein the at least one peripheral computing component implements a plurality of PCIe physical functions (PFs); and
   wherein each of the plurality of interfaces is associated with one of the plurality of PCIe PFs.

7. The computing device of claim 1, wherein the at least one peripheral computing component is at least one digital communication network adapter.

8. The computing device of claim 5, wherein the code is further for:
   configuring the at least one peripheral computing component to allow the first hardware processor to access at least one first component value of the at least one peripheral computing component by accessing at least one first local memory address local to the first hardware processor; and
   configuring the at least one peripheral computing component to allow the second hardware processor to access at least one second component value of the at least one peripheral computing component by accessing at least one second local memory address local to the second hardware processor.

9. The computing device of claim 5, wherein the code is additionally for:
   configuring the at least one peripheral computing component to access at least one third memory location in a third memory component electrically coupled with a third hardware processor of the plurality of hardware processors via a third electrical connection between the peripheral computing component and the third hardware processor, instead of accessing the at least one first memory location.

10. A method for a computing device, comprising:
   configuring at least one peripheral computing component of a computing device to access at least one first memory location in a first memory component electrically coupled with a first hardware processor of a plurality of hardware processors of the computing device via a first electrical connection between the peripheral computing component and the first hardware processor; and
   configuring the at least one peripheral computing component to access at least one second memory location in a second memory component electrically coupled with a second hardware processor of the plurality of hardware processors via a second electrical connection between the peripheral computing component and the second hardware processor;
   wherein the first hardware processor is not the second hardware processor;
   wherein the first electrical connection is not the second electrical connection;
   wherein the code is further for:
   configuring the at least one peripheral computing component to allow the first hardware processor to access at least one first component value of the at least one peripheral computing component by accessing at least one first local memory address local to the first hardware processor; and
   configuring the at least one peripheral computing component to allow the second hardware processor to access at least one second component value of the at least one peripheral computing component by accessing at least one second local memory address local to the second hardware processor
   wherein the at least one peripheral computing component exposes a plurality of interfaces, each comprising a plurality of registers;
   wherein configuring the at least one peripheral computing component to access the at least one first memory location comprises writing to at least one first register of a first interface of the plurality of interfaces;
   wherein configuring the at least one peripheral computing component to allow the first hardware processor to access the at least one first component value comprises writing to at least one second register of the first interface of the plurality of interfaces;
   wherein configuring the at least one peripheral computing component to access the at least one second memory location comprises writing to at least one third register of a second interface of the plurality of interfaces; and
   wherein configuring the at least one peripheral computing component to allow the second hardware processor to access the at least one second component value comprises writing to at least one fourth register of the second interface of the plurality of interfaces.

\* \* \* \* \*